United States Patent
Wu (10) Patent No.: US 10,650,987 B2
(45) Date of Patent: May 12, 2020

(54) PRESS SOUND PRODUCING KEYBOARD SWITCH

(71) Applicant: DONGGUAN CITY KAIHUA ELECTRONICS CO., LTD, Guangdong (CN)

(72) Inventor: FuXi Wu, Dongguan (CN)

( * ) Notice: Subject to any disclaimer, the term of this patent is extended or adjusted under 35 U.S.C. 154(b) by 0 days.

(21) Appl. No.: 16/188,316

(22) Filed: Nov. 13, 2018

(65) Prior Publication Data

US 2019/0096606 A1   Mar. 28, 2019

Related U.S. Application Data (63) Continuation of application No. PCT/CN2017/103450, filed on Sep. 26, 2017.

(30) Foreign Application Priority Data

Sep. 2, 2016  (CN) .......................... 2016 1 0802371

(51) Int. Cl.
   *H01H 13/22*   (2006.01)
   *H01H 13/85*   (2006.01)
   *H01H 5/14*   (2006.01)

(52) U.S. Cl.
   CPC .............. *H01H 13/85* (2013.01); *H01H 5/14* (2013.01); *H01H 13/22* (2013.01); *H01H 2215/03* (2013.01); *H01H 2235/012* (2013.01)

(58) Field of Classification Search
   CPC .. H01H 13/70; H01H 13/705; H01H 13/7065; H01H 13/7073; H01H 2215/002; H01H 2215/03; H01H 2235/00
   See application file for complete search history.

(56) References Cited

U.S. PATENT DOCUMENTS

| 5,015,811 A | * | 5/1991 | Moriyama | ............. H01H 13/50 200/308 |
| 10,079,123 B2 | * | 9/2018 | Yu | ......................... H01H 13/705 |
| 2017/0213666 A1 | | 7/2017 | Yu | |
| 2017/0309421 A1 | | 10/2017 | Yu | |

FOREIGN PATENT DOCUMENTS

| CN | 1741219 | 3/2006 |
| CN | 204130403 | 1/2015 |
| CN | 204348569 | 5/2015 |
| CN | 104992854 | 10/2015 |
| CN | 106158470 | 11/2016 |
| CN | 106158478 | 11/2016 |

(Continued)

*Primary Examiner* — Vanessa Girardi
(74) *Attorney, Agent, or Firm* — Jie Yang; Zanip (57) ABSTRACT

A press sound producing keyboard switch includes a base, a guiding inclined surface and an elastic piece provided on the base, and a cap covering the base to define an accommodating cavity. A press assembly, a spring and a conduction assembly is disposed in the accommodating cavity. A press block is provided on the press assembly. Wherein the press block is in triangular shape, length of a bottom surface of the press block is less than width of a bottom surface of the guiding inclined surface, an end portion of the elastic piece is located below the press block and above the guiding inclined surface, and the press block is located at a side of the guiding inclined surface.

15 Claims, 5 Drawing Sheets

(56) References Cited

FOREIGN PATENT DOCUMENTS

| | | |
|---|---|---|
| CN | 106158479 | 11/2016 |
| CN | 106158481 | 11/2016 |
| CN | 206022174 | 3/2017 |
| CN | 106206130 | 6/2018 |
| DE | 112015005845 | 9/2017 |
| DE | 112015005835 | 10/2017 |
| WO | 2016107545 | 7/2016 |
| WO | 2016107546 | 7/2016 |

* cited by examiner

PRESS SOUND PRODUCING KEYBOARD SWITCH

CROSS-REFERENCE TO RELATED APPLICATION

This application is a continuation of International Patent Application No. PCT/CN2017/103450, filed on Sep. 26, 2017, which claims priority benefit of Chinese Patent Application No. 201610802371.0, filed on Sep. 2, 2016. The entirety of each of the above-mentioned patent applications is hereby incorporated by reference herein and made a part of this specification.

BACKGROUND OF THE INVENTION

1. Field of the Invention

The present disclosure relates to keyboard switch, and more particularly, to a keyboard switch which produces press sound.

2. Description of Related Art

Keyboard switch is the most often used input means in many operations of an electronic equipment. Quality of keyboard switch determines experience of relating input device, which requires the keyboard switches to be made with good touch feeling and acoustic feeling. In prior art, a thin keyboard switch adopted mental flake as movable contact flake lacks touch feel when pressing due to insufficient resilience and inner space limitation in a keyboard switch. Manufactures launch constant improvement designs in many fields from material of mental flake to shape etc. to improve press feeling. However, improvements are always limited to press feeling, under limitation of inner space inside the keyboard switch, it is infeasible to generate press sound as well as big keyboard switch all long.

SUMMARY

To solve the aforementioned technical problem, objectives of embodiment of the present disclosure are to provide a keyboard switch which produces press sound, to take full advantage of inner space, to make the keyboard switch have better touch feeling in press process on condition of minimal size keyboard switch, and to produce press sound in press process, solving a longtime technical problem for ultra-thin keyboard switch due to space limitation of impossibility to produce press sound like big keyboard switches, and thereby improving user experience.

One embodiment of the present invention provides a press sound producing keyboard switch includes a base, a guiding inclined surface and an elastic piece provided on the base, and a cap covering the base to define an accommodating cavity. A press assembly is disposed in the accommodating cavity, an upper portion of the press assembly located at an upper portion of the cap, a press block provided on the press assembly. A spring is disposed in the accommodating cavity, located between a bottom portion of the press assembly and the base. A conduction assembly is disposed in the accommodating cavity. Wherein the press block is in triangular shape, length of a bottom surface of the press block is less than width of a bottom surface of the guiding inclined surface, an end portion of the elastic piece is located below the press block and above the guiding inclined surface, and the press block is located at a side of the guiding inclined surface.

Another embodiment of the present invention provides a keyboard, having a plurality of keyboard switches in an array, each of the keyboard switches includes a base, a guiding inclined surface and an elastic piece provided on the base, and a cap covering the base to define an accommodating cavity, a press assembly is disposed in the accommodating cavity, an upper portion of the press assembly located at an upper portion of the cap, a press block provided on the press assembly; a spring is disposed in the accommodating cavity, located between a bottom portion of the press assembly and the base. A conduction assembly is disposed in the accommodating cavity. Wherein the press block is in triangular shape, length of a bottom surface of the press block is less than width of a bottom surface of the guiding inclined surface, an end portion of the elastic piece is located below the press block and above the guiding inclined surface, and the press block is located at a side of the guiding inclined surface.

Another embodiment of the present invention provides an electronic apparatus having at least one keyboard with a plurality of keyboard switches in an array, each of the keyboard switches includes a base, a guiding inclined surface and an elastic piece provided on the base, and a cap, covering the base to define an accommodating cavity. A press assembly is disposed in the accommodating cavity, an upper portion of the press assembly located at an upper portion of the cap, a press block provided on the press assembly. A spring is disposed in the accommodating cavity, located between a bottom portion of the press assembly and the base. A conduction assembly is disposed in the accommodating cavity. Wherein the press block is in triangular shape, length of a bottom surface of the press block is less than width of a bottom surface of the guiding inclined surface, an end portion of the elastic piece is located below the press block and above the guiding inclined surface, and the press block is located at a side of the guiding inclined surface.

Effective results of the embodiment of the present disclosure are listed below: Relying on incorporated structures of press block on the press assembly, guiding inclined surface on the base, and the elastic piece, during pressing course of the press assembly, the elastic piece falls out from the press block along with the guiding inclined surface, and the elastic piece releases potential energy and knaps the base to generate press sound. The embodiment of the present disclosure provides a keyboard switch which produces press sound, to take full advantage of inner space of the keyboard switch, to make the keyboard switch have better touch feeling in press process on condition of minimal size keyboard switch, and to produce press sound in press process, solving a longtime technical problem for ultra-thin keyboard switch due to space limitation of impossibility to produce press sound like big keyboard switches, and thereby improving user experience.

The above illustration is an overview of an embodiment of the present disclosure, at least one embodiment is exemplarily described with reference to pictures in corresponding attached drawings for further detail illustration of the embodiments.

DETAILED DESCRIPTION

To make the objective, technical solutions and advantages of the present disclosure clearer, the present disclosure will be further detailed with reference to specific embodiments thereof and the attached drawings.

Embodiment 1

Please referring to FIG. 1 to FIG. 7, the present embodiment provides a press sound producing keyboard switch, includes a base 1 and a cap 2, the cap 2 covers the base 1 to define an accommodating cavity, a press assembly, a spring 4 and a conduction assembly 5 are disposed in the accommodating cavity, the spring 4 is located between a bottom portion of the press assembly and the base 1, and an upper portion of the press assembly is located at an upper portion of the cap 2. A press block 31 is provided on the press assembly, a guiding inclined surface 11 and an elastic piece 6 are respectively provided on the base 1, an end portion of the elastic piece 6 is located directly below the press block 31 and directly above the guiding inclined surface 11. The press block 31 is located at a side of the guiding inclined surface 11, functioned as a press contact for the elastic piece 6.

Figure 4:
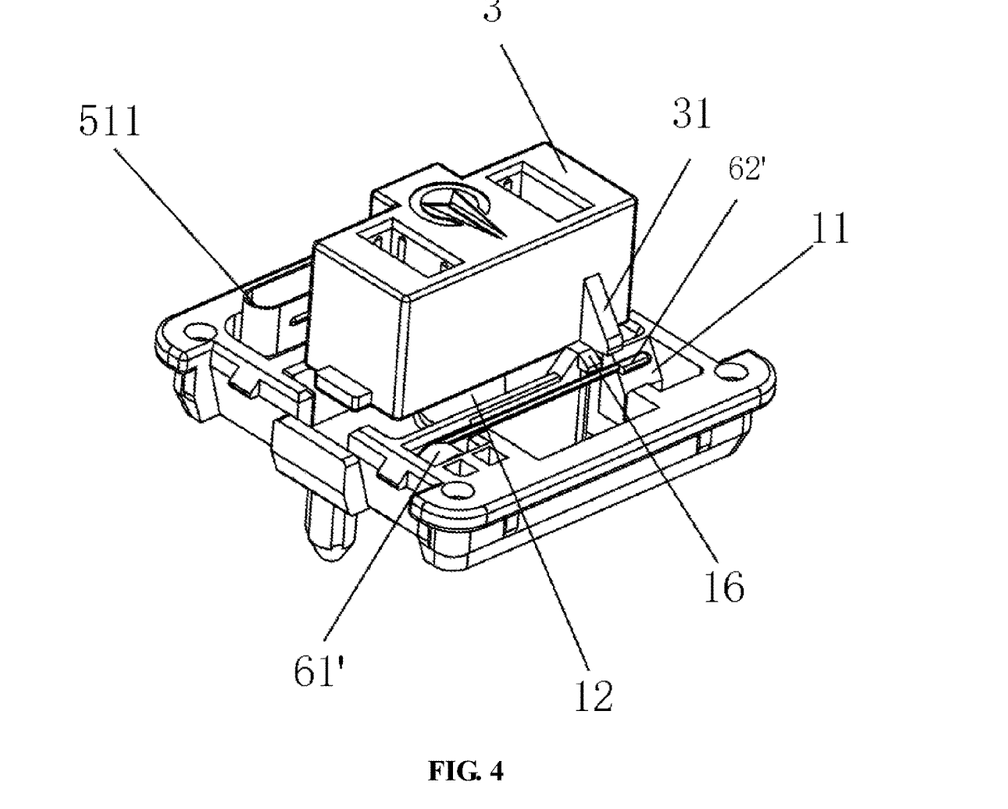
FIG. 4 is another partial structure diagram of the game joystick switch.
Figure 5:
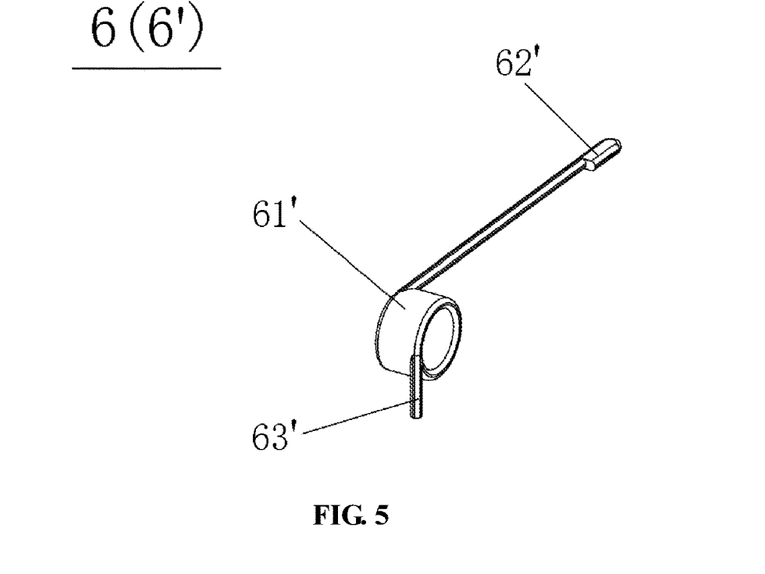
FIG. 5 is a structure diagram of an elastic piece of the game joystick switch.

In present embodiment, as shown in FIG. 4 and FIG. 5, the elastic piece 6 is torsional spring 6', the torsional spring 6' includes a spring body 61', a first terminal 62' extended from an upper portion of the spring body 61', and a second terminal 63' extended from a lower portion of the spring body 61'. The first terminal 62' of the torsional spring 6' is extended right under the press block 31, the second terminal 63' is fixed onto the base 1, and the first terminal 62' of the torsional spring 6' is abutted on a lower surface of the press block 31. When the press assembly is pressed down, bringing the press block 31 along to descend, the guiding inclined surface 11 on the base 1 guides the first terminal 62' of the torsional spring 6' to get away from restriction of the press block 31, thereby springing back under restoring force and knocking the base 1 to generate press sound.

Meanwhile, the press assembly includes a press core 3, the press block 31 is disposed on one side of the press core 3, and the press block 31 is triangular in term of overall structure. A tilted face 311 is formed at an end portion of the press block 31, and the press block is triangular in term of overall structure. When the press block 31 is pressed down, configuration of the tilted face 311 plays a further guiding role in the actuation of the first terminal 62' of the torsional spring 6' to get away from restriction of the press block 31. And a bottom surface of the press block 31 is at angle to the press assembly in not more than 90 degrees.

As shown in FIG. 4, as a further improvement of the present embodiment, length of the bottom surface of the press block 31 is less than width of the bottom surface of the guiding inclined surface 11. On condition that length of the bottom surface of the press block 31 is longer than or equal to width of the bottom surface of the guiding inclined surface 11, in the course of pushing down the press block 31, until the first terminal 62' of the torsional spring 6' moves to the bottom of the guiding inclined surface 11, the first terminal 62' of the torsional spring 6' is still unable to get away from restriction of the press block 31. Only setting length of the bottom surface of the press block 31 less than width of the bottom surface of the guiding inclined surface 11, can the first terminal 62' of the torsional spring 6' already get away from restriction of the press block 31, during the constant inclined moving course of the first terminal 62' of the torsional spring 6' along the guiding inclined surface 11, before reaching the bottom of the guiding inclined surface 11, which facilitates a springing back under restoring force of the torsional spring 6' and knocking the base 1 to generate press sound.

Figure 1:
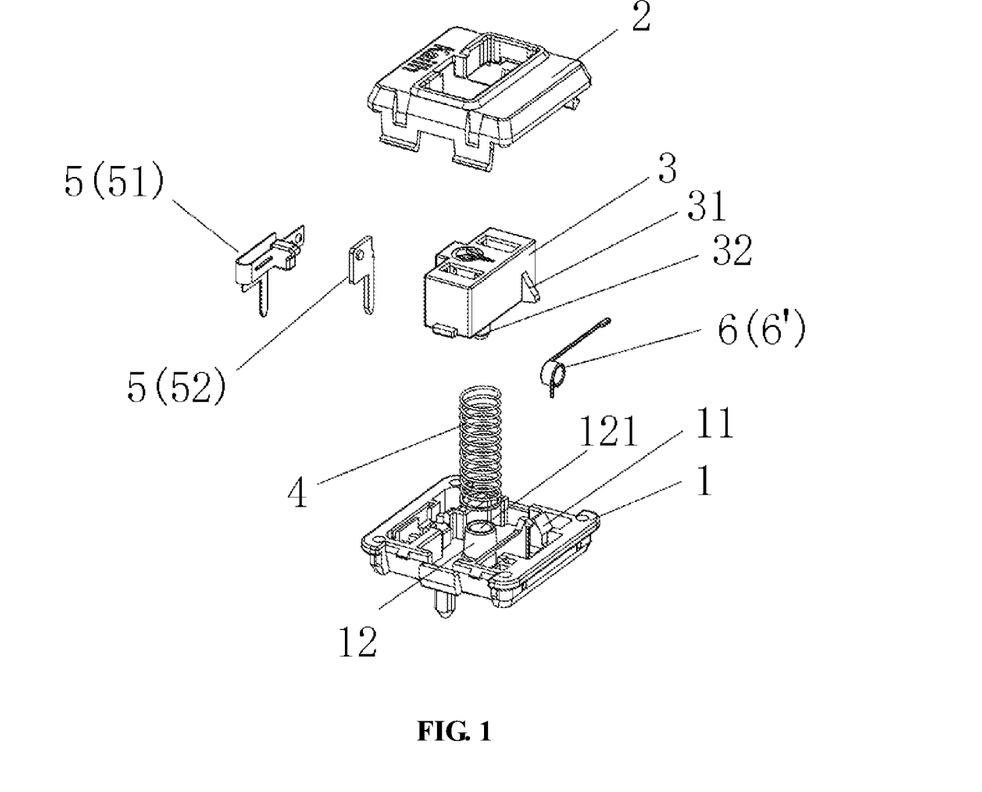
FIG. 1 is an exploded view of a press sound producing keyboard switch in a preferred embodiment of the present disclosure.
Figure 2:
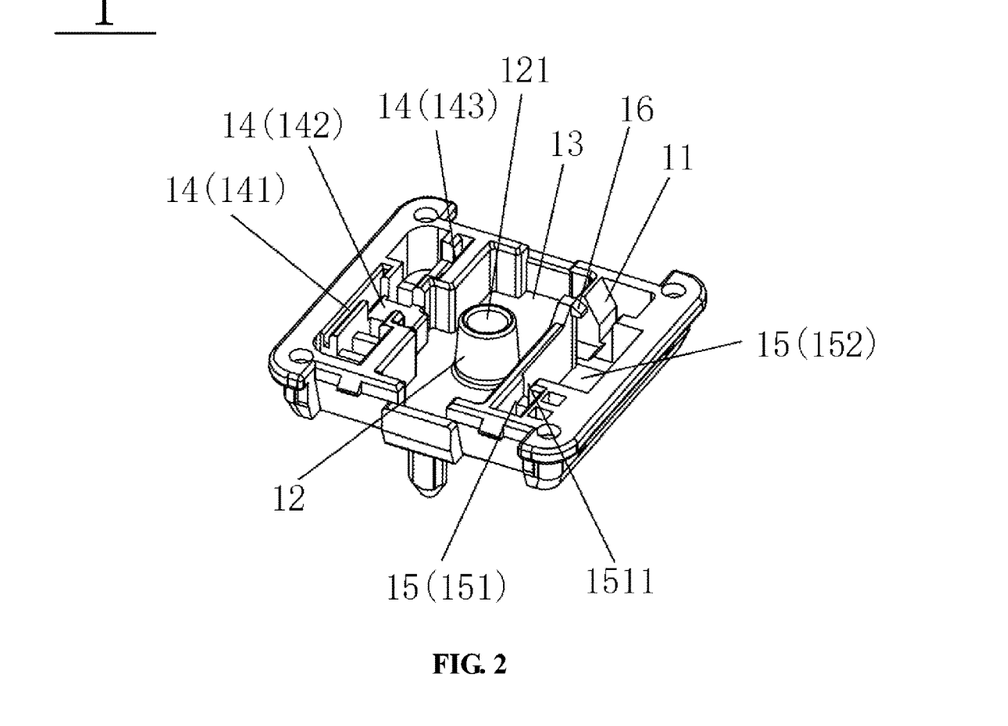
FIG. 2 is a structure diagram of a base of the game joystick switch in the preferred embodiment.

As shown in FIG. 2, a guiding pillar 12 is upwardly arranged on bottom of the base 1, a guiding hole 121 is defined in the guiding pillar 12, a positioning post 32 is disposed at a bottom portion of the press assembly for insertion into the guiding hole 121, and the spring 4 is sleeved around the guiding pillar 12 and the positioning post 32.

Figure 6:
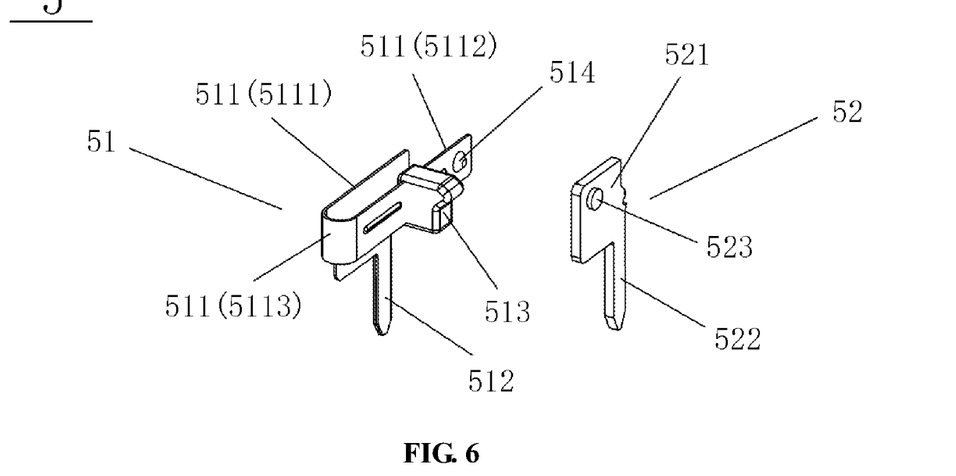
FIG. 6 is a structure diagram of a conduction assembly of the game joystick switch.
Figure 7:
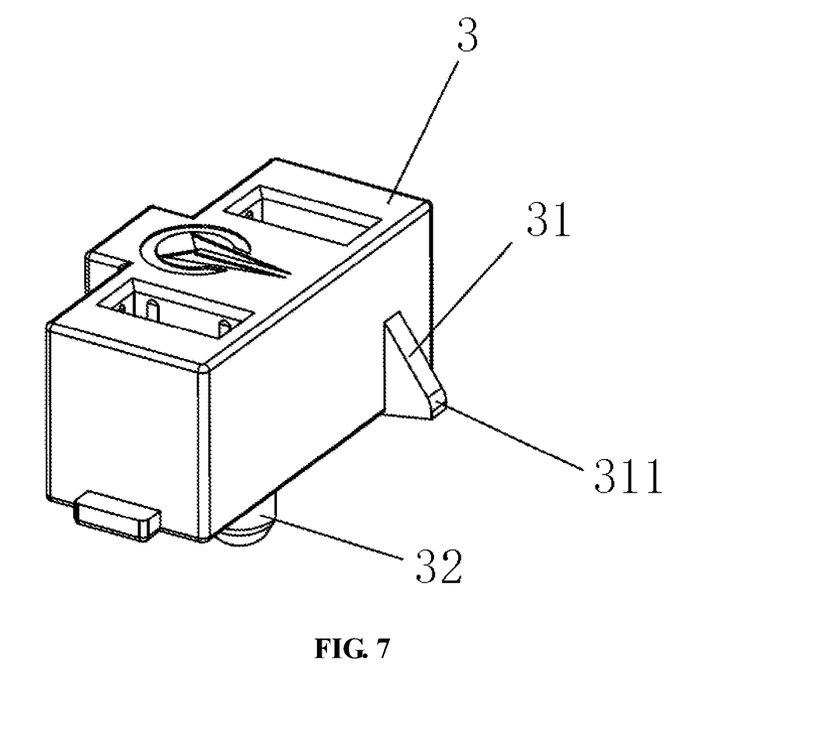
FIG. 7 is a structure diagram of a press assembly of the game joystick switch.

Referring to FIG. 6, the conduction assembly 5 includes a movable reed 51 and a static reed 52, wherein the movable reed 51 includes a movable reed outlet unit 511, a first plug pin 512 extended from a lower portion of the movable reed outlet unit 511, a pressing portion 513 formed on a side portion of the movable reed outlet unit 511, and a movable contact 514. The movable reed outlet unit 511 is in U shape, and the movable reed outlet unit 511 includes a left movable reed connecting flake 5111, a right movable reed connecting flake 5112 and an arced movable reed connecting flake 5113 connected between the left movable reed connecting flake 5111 and the right movable reed connecting flake 5112. The first plug pin 512 is arranged at bottom of the left movable reed connecting flake 5111. The pressing portion 513 and the movable contact 514 are formed on a side portion of the right movable reed connecting flake 5112. The static reed 52 includes a static reed connecting plate 521, a second plug pin 522 formed at bottom of the static reed connecting plate 521, and a static contact 523 formed on the static reed connecting plate 521 corresponding to the movable contact 514.

Figure 3:
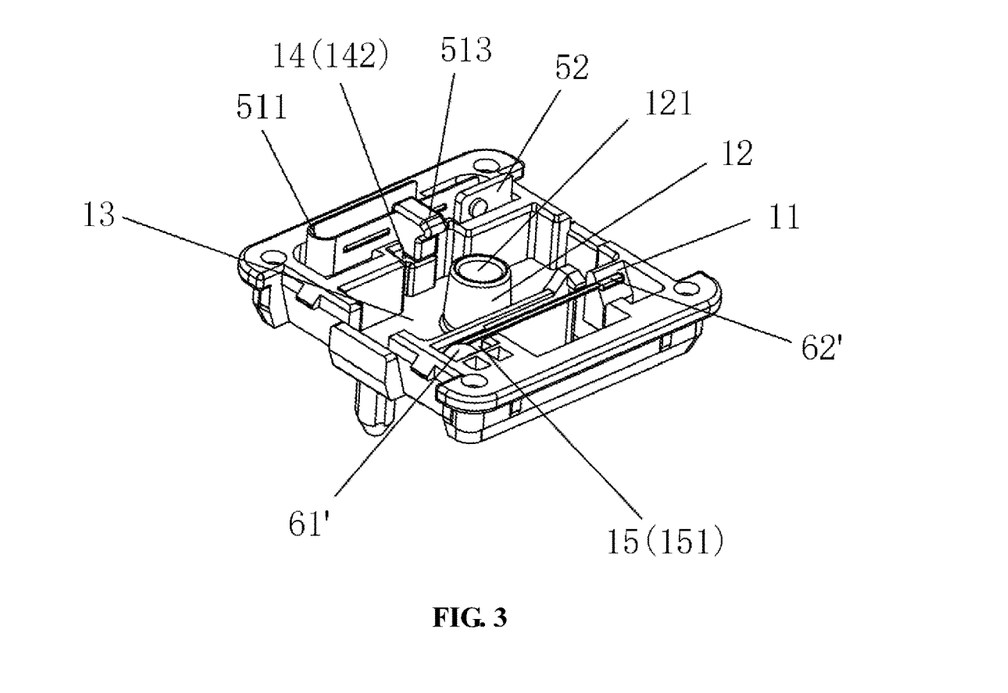
FIG. 3 is a partial structure diagram of the game joystick switch.

As shown in FIG. 2 and FIG. 3, a middle containing groove 13 is defined for insertion of the press assembly in the middle bottom of the base 1. A left containing groove 14 is defined for insertion of the conduction assembly 5 in bottom of the base 1 beside the middle containing groove 13 on the left, and a right containing groove 15 is defined for insertion of the elastic piece 6 in bottom of the base 1 beside the middle containing groove on the right 13. A first slot 141 defined for mounting the left movable reed connecting flake 5111, a boss 142 formed for supporting the pressing portion 513, and a second slot 143 defined for mounting static reed 52 are provided within the left containing groove 14. A third slot 151 defined for mounting the spring body 61' of the torsional spring 6', and a fourth slot 152 defined for receiving the first terminal 62' of the torsional spring 6' are provided within the right containing groove 15. A notch 1511 is defined beside the third slot 151 for the first terminal 62' of the torsional spring 6' to cross through.

Meanwhile, a limit portion 16 is formed on bottom of the base 1, and the limit portion 16 is located beside the press block 31 and right above the end portion of the elastic piece 6.

Embodiment 2

Figure 8:
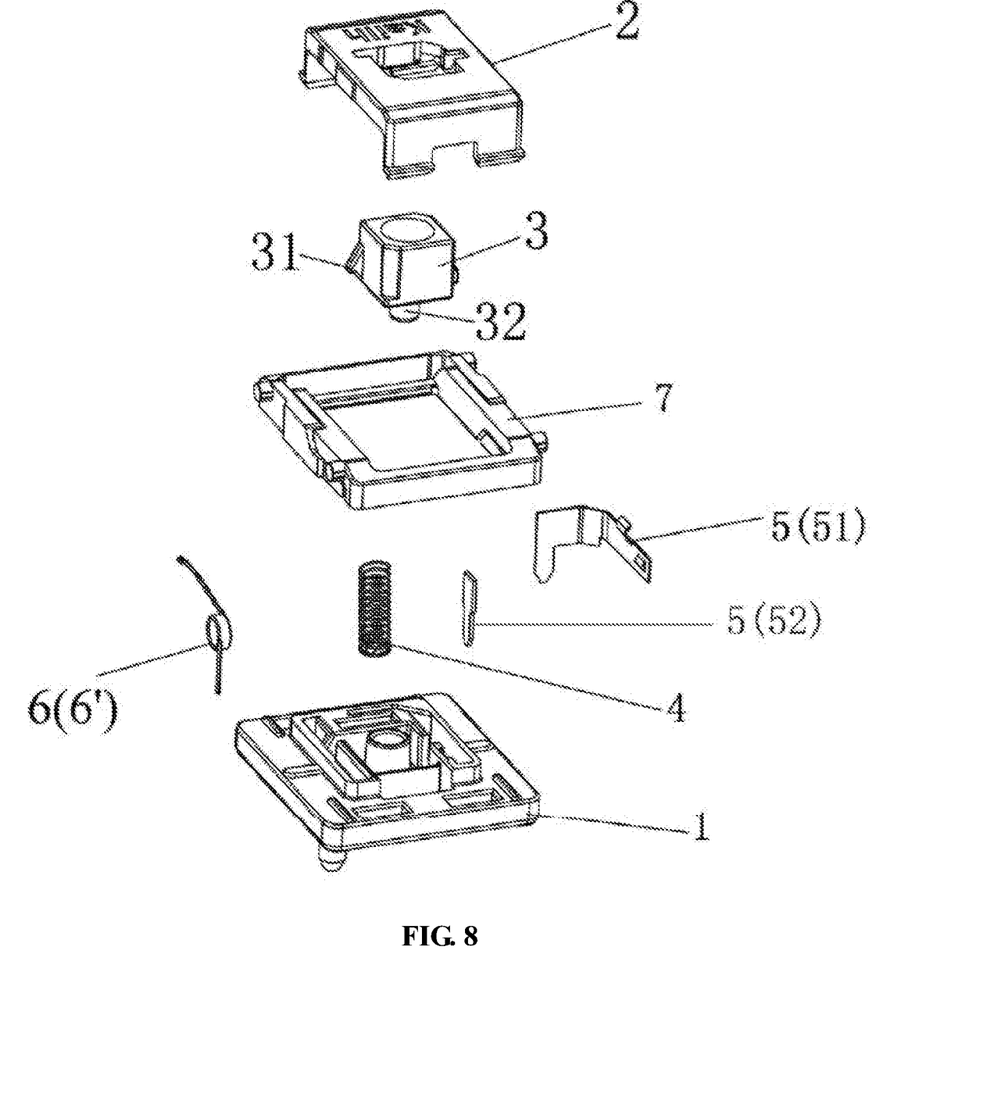
FIG. 8 is an exploded view of another press sound producing keyboard switch in an alternative embodiment of the disclosure.

Referring to FIG. 8, the main distinguishing features between the preferred embodiment and the alternative embodiment are listed as follows: the press assembly includes a press core 3 and a balancing bracket 7. The press block 31 is arranged on a side portion of the press core 3 or the balancing bracket 7, a tilted face 311 is formed at an end portion of the press block 31, and the press block 31 is in triangular shape in term of overall structure.

In present embodiment, the balancing bracket 7 is used for positioning press core 3. When four corners of press assembly are pressed, the balancing bracket 7 can render central axis of the press assembly always perpendicular to central axis of the guiding pillar 12 of the base 1, so that in the pressing course, the press assembly is not easy to incline or get the keyboard switch stuck, thereby insuring the keyboard switch convenient to operate, with better smooth hand feeling and good finger-press contact feeling during pressing courses.

The working principle of the present disclosure are described below: in application, when the press assembly is pressed down, the positioning post 32 of the press assembly moves down along the guiding hole 121 in the guiding pillar 12 on the base 1, the spring 4 is squeezed, at the same time, make the movable contact 514 of the movable reed 51 touch the static contact 523 of the static reed 52 so as to perform a turn-on operation of the keyboard switch. Meanwhile, in the pressing course of the press assembly, the press block 31 on the press assembly pushes the elastic piece, i.e., the first terminal 62' of torsional spring 6', the first terminal 62' of torsional spring 6' is detached from the press block 31 of the press assembly along with the guiding inclined surface 11 of the base 1, and the elastic piece releases potential energy and knaps the base 1 to generate press sound. When pression force on the press assembly is removed, due to resilience of the spring 4, the press assembly is moved upward to reinstate to where it is before the press assembly is pressed, and the movable contact 514 of the movable reed 51 is touched to disconnect engagement with the static contact 523 of the static reed 52, so as to perform a turn-off operation of the keyboard switch.

The essential point of the present disclosure is described as below, relying on incorporated structures of press block on the press assembly, guiding inclined surface on the base, and the elastic piece, during pressing course of the press assembly, the elastic piece is detached from the press block along with the guiding inclined surface, and the elastic piece releases potential energy and knaps the base to generate press sound. Taking full advantage of inner space of the keyboard switch, the keyboard switch has better touch feeling in press process on condition of minimal size keyboard switch. Producing press sound in press process can solve a longtime technical problem for ultra-thin keyboard switch due to space limitation of impossibility to produce press sound like big keyboard switches, and thereby improving user experience.

What described above are only the preferred embodiments of the present disclosure and are not intended to limit the present technical disclosure. Any modifications, equivalent replacements, and alterations made within the spirits and principles of the present technical disclosure shall be included in the scope of the present disclosure.

What is claimed is:

1. A press sound producing keyboard switch, comprising:
a base, wherein a guiding inclined surface and an elastic piece are provided on the base, and a limit portion formed on bottom of the base;
a cap, covering the base to define an accommodating cavity;
a press assembly, disposed in the accommodating cavity, wherein an upper portion of the press assembly is located at an upper portion of the cap, a press block is provided on the press assembly, and the limit portion is located beside the press block and right above an end portion of the elastic piece;
a spring, disposed in the accommodating cavity, wherein the spring is located between a bottom portion of the press assembly and the base; and
a conduction assembly, disposed in the accommodating cavity;
wherein the press block is in a triangular shape, a length of a bottom surface of the press block is less than a width of a bottom surface of the guiding inclined surface, an end portion of the elastic piece is located below the press block and above the guiding inclined surface, and the press block is located at a side of the guiding inclined surface.

2. The press sound producing keyboard switch of claim 1, wherein the elastic piece is a torsional spring, the torsional spring comprises a spring body, a first terminal extended from an upper portion of the spring body, and a second terminal extended from a lower portion of the spring body, the first terminal of the torsional spring is extended right under the press block, the second terminal is fixed onto the base, and the first terminal of the torsional spring is abutted on a lower surface of the press block.

3. The press sound producing keyboard switch of claim 1, wherein the press assembly comprises a press core, the press block is disposed on one side of the press core, a tilted face is formed at an end portion of the press block, and the press block is in a triangular shape in term of overall structure.

4. The press sound producing keyboard switch of claim 1, wherein the press assembly comprises a press core and a balancing bracket, the press block is disposed on a side portion of the press core or on a side portion of the balancing bracket, a tilted face is formed at an end portion of the press block, and the press block is in a triangular shape in term of overall structure.

5. The press sound producing keyboard switch of claim 1, wherein a bottom surface of the press block is at an angle to the press assembly, and the angle is less than 90 degrees.

6. The press sound producing keyboard switch of claim 1, wherein a guiding pillar is upwardly arranged on a bottom of the base, a guiding hole is defined in the guiding pillar, a positioning post is disposed at a bottom portion of the press assembly for insertion into the guiding hole, and the spring is sleeved around the guiding pillar and the positioning post.

7. The press sound producing keyboard switch of claim 1, wherein the conduction assembly comprises a movable reed and a static reed, the movable reed comprises a movable reed outlet unit, a first plug pin extended from a lower portion of the movable reed outlet unit, a pressing portion formed on a side portion of the movable reed outlet unit, and a movable contact, the movable reed outlet unit is in an U shape, the movable reed outlet unit comprises a left movable reed connecting flake, a right movable reed connecting flake and an arced movable reed connecting flake connected between the left movable reed connecting flake and the right movable reed connecting flake, the first plug pin is arranged at a bottom of the left movable reed connecting flake, the pressing portion and the movable contact are formed on a side portion of the right movable reed connecting flake, and the static reed comprises a static reed connecting plate, a second plug pin formed at bottom of the static reed connecting plate, and a static contact formed on the static reed connecting plate corresponding to the movable contact.

8. The press sound producing keyboard switch of claim 1, wherein a middle containing groove is defined for insertion of the press assembly in a middle bottom of the base, a left containing groove is defined for insertion of the conduction assembly in a bottom of the base and disposed on a left side of the middle containing groove, and a right containing groove is defined for insertion of the elastic piece in a bottom of the base and disposed on a right side of the middle containing groove.

9. The press sound producing keyboard switch of claim 8, wherein a first slot defined for mounting the left movable reed connecting flake, a boss formed for supporting the pressing portion, and a second slot defined for mounting static reed are provided within the left containing groove, a third slot defined for mounting the spring body of the torsional spring, and a fourth slot defined for receiving a first terminal of the torsional spring are provided within the right containing groove, and a notch is defined beside the third slot for the first terminal of the torsional spring to cross through.

10. A keyboard, comprising a plurality of keyboard switches in an array, each of the keyboard switches comprising:
   a base, wherein a guiding inclined surface and an elastic piece are provided on the base, and a limit portion is formed on bottom of the base;
   a cap, covering the base to define an accommodating cavity;
   a press assembly, disposed in the accommodating cavity, wherein an upper portion of the press assembly is located at an upper portion of the cap, a press block is provided on the press assembly, and the limit portion is located beside the press block and right above an end portion of the elastic piece;
   a spring, disposed in the accommodating cavity, wherein the spring is located between a bottom portion of the press assembly and the base; and
   a conduction assembly, disposed in the accommodating cavity;
   wherein the press block is in a triangular shape, a length of a bottom surface of the press block is less than a width of a bottom surface of the guiding inclined surface, an end portion of the elastic piece is located below the press block and above the guiding inclined surface, and the press block is located at a side of the guiding inclined surface.

11. The keyboard of claim 10, wherein the elastic piece is a torsional spring, the torsional spring comprises a spring body, a first terminal extended from an upper portion of the spring body, and a second terminal extended from a lower portion of the spring body, the first terminal of the torsional spring is extended right under the press block, the second terminal is fixed onto the base, and the first terminal of the torsional spring is abutted on a lower surface of the press block; the press assembly comprises a press core, the press block is disposed on one side of the press core, a tilted face is formed at an end portion of the press block, and the press block is in a triangular shape in term of overall structure.

12. The keyboard of claim 10, wherein the elastic piece is a torsional spring, the torsional spring comprises a spring body, a first terminal extended from an upper portion of the spring body, and a second terminal extended from a lower portion of the spring body, the first terminal of the torsional spring is extended right under the press block, the second terminal is fixed onto the base, and the first terminal of the torsional spring is abutted on a lower surface of the press block; the press assembly comprises a press core and a balancing bracket, the press block is disposed on a side portion of the press core or on a side portion of the balancing bracket, a tilted face is formed at an end portion of the press block, and the press block is in a triangular shape in term of overall structure.

13. An electronic apparatus, comprising at least one keyboard with a plurality of keyboard switches in an array, each of the keyboard switches comprising,
   a base, wherein a guiding inclined surface and an elastic piece are provided on the base, and a limit portion is formed on bottom of the base;
   a cap, covering the base to define an accommodating cavity;
   a press assembly, disposed in the accommodating cavity, wherein an upper portion of the press assembly is located at an upper portion of the cap, a press block is provided on the press assembly, and the limit portion is located beside the press block and right above an end portion of the elastic piece;
   a spring, disposed in the accommodating cavity, wherein the spring is located between a bottom portion of the press assembly and the base; and
   a conduction assembly, disposed in the accommodating cavity;
   wherein the press block is in a triangular shape, a length of a bottom surface of the press block is less than a width of a bottom surface of the guiding inclined surface, an end portion of the elastic piece is located below the press block and above the guiding inclined surface, and the press block is located at a side of the guiding inclined surface.

14. The electronic apparatus of claim 13, wherein the elastic piece is a torsional spring, the torsional spring comprises a spring body, a first terminal extended from an upper portion of the spring body, and a second terminal extended from a lower portion of the spring body, the first terminal of the torsional spring is extended right under the press block, the second terminal is fixed onto the base, and the first terminal of the torsional spring is abutted on a lower surface of the press block; the press assembly comprises a press core, the press block is disposed on one side of the press core, a tilted face is formed at an end portion of the press block, and the press block is in a triangular shape in term of overall structure.

15. The electronic apparatus of claim 13, wherein the elastic piece is a torsional spring, the torsional spring comprises a spring body, a first terminal extended from an upper portion of the spring body, and a second terminal extended from a lower portion of the spring body, the first terminal of the torsional spring is extended right under the press block, the second terminal is fixed onto the base, and the first terminal of the torsional spring is abutted on a lower surface of the press block; the press assembly comprises a press core and a balancing bracket, the press block is disposed on a side portion of the press core or on a side portion of the balancing bracket, a tilted face is formed at an end portion of the press block, and the press block is in a triangular shape in term of overall structure.

* * * * *